United States Patent
Chen et al.

(10) Patent No.: US 10,803,343 B2
(45) Date of Patent: *Oct. 13, 2020

(54) MOTION-AWARE KEYPOINT SELECTION SYSTEM ADAPTABLE TO ITERATIVE CLOSEST POINT

(71) Applicants: NCKU Research and Development Foundation, Tainan (TW); Himax Technologies Limited, Tainan (TW)

(72) Inventors: Chun-Wei Chen, Tainan (TW); Wen-Yuan Hsiao, Tainan (TW); Ming-Der Shieh, Tainan (TW)

(73) Assignees: NCKU Research and Development Foundation, Tainan (TW); Himax Technologies Limited, Tainan (TW)

(*) Notice: Subject to any disclaimer, the term of this patent is extended or adjusted under 35 U.S.C. 154(b) by 80 days.

This patent is subject to a terminal disclaimer.

(21) Appl. No.: 16/291,483

(22) Filed: Mar. 4, 2019

(65) Prior Publication Data

US 2020/0234075 A1    Jul. 23, 2020

Related U.S. Application Data

(63) Continuation-in-part of application No. 16/255,357, filed on Jan. 23, 2019.

(51) Int. Cl.
*G06K 9/46* (2006.01)
*G06K 9/32* (2006.01)

(52) U.S. Cl.
CPC ......... *G06K 9/4671* (2013.01); *G06K 9/3233* (2013.01); *G06K 9/4604* (2013.01); *G06K 9/4652* (2013.01)

(58) Field of Classification Search
CPC .. G06K 9/4604; G06K 9/4952; G06K 9/4671; G06K 9/3233; G06K 9/6282
See application file for complete search history.

(56) References Cited

U.S. PATENT DOCUMENTS

| | | | |
|---|---|---|---|
| 9,053,372 B2* | 6/2015 | Ranganathan | G06K 9/00798 |
| 9,721,150 B2* | 8/2017 | Gottemukkula | G06K 9/00268 |
| 10,282,913 B2* | 5/2019 | Kellogg | G06T 7/579 |
| 10,395,383 B2* | 8/2019 | Alibay | G06T 7/73 |
| 10,453,213 B2* | 10/2019 | Tsai | G06T 7/246 |
| 10,504,008 B1* | 12/2019 | Powers | G06K 9/6282 |
| 2011/0255741 A1* | 10/2011 | Jung | G06K 9/00369 382/103 |
| 2017/0076146 A1* | 3/2017 | Saripalle | G06K 9/4642 |
| 2020/0234075 A1* | 7/2020 | Chen | G06K 9/4604 |

* cited by examiner

*Primary Examiner* — Gregory M Desire
(74) *Attorney, Agent, or Firm* — Donald E. Stout; Stout, Uxa & Buyan, LLP

(57) ABSTRACT

A motion-aware keypoint selection system adaptable to iterative closest point (ICP) includes a pruning unit that receives an image and selects at least one region of interest (ROI) composed of a selected subset of points on the image; a point quality estimation unit that generates point quality of each point in the ROI according to a frame rate; and a suppression unit that receives the point quality and generates keypoints by screening the ROI.

11 Claims, 6 Drawing Sheets

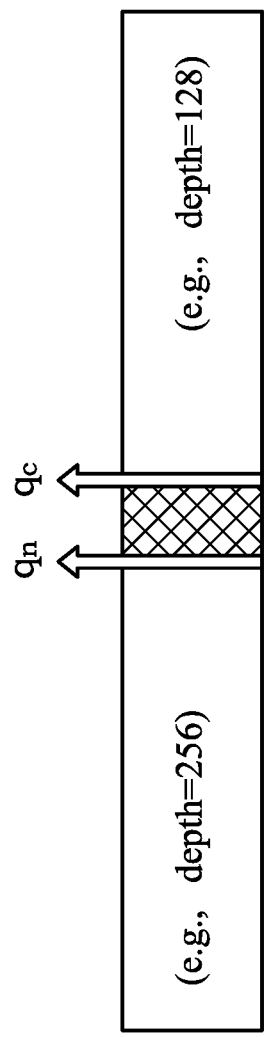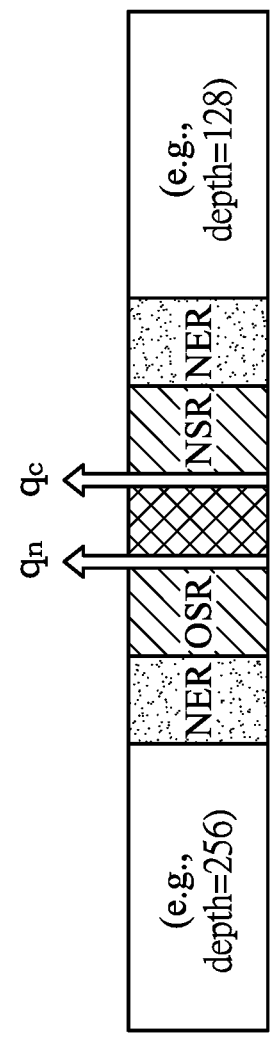

MOTION-AWARE KEYPOINT SELECTION SYSTEM ADAPTABLE TO ITERATIVE CLOSEST POINT

CROSS-REFERENCE TO RELATED APPLICATIONS

This application is a continuation-in-part of U.S. application Ser. No. 16/255,357, filed on Jan. 23, 2019 and entitled MOTION-AWARE KEYPOINT SELECTION SYSTEM ADAPTABLE TO ITERATIVE CLOSEST POINT, the entire contents of which are herein expressly incorporated by reference.

BACKGROUND OF THE INVENTION

1. Field of the Invention

The present invention generally relates to iterative closest point (ICP), and more particularly to a motion-aware keypoint selection system adaptable to ICP.

2. Description of Related Art

Iterative closest point (ICP) is a technique adapted to minimizing difference between two clouds of points. Specifically, a target (or reference) cloud is kept fixed, while a source cloud is transformed to best match the target cloud.

ICP may be applied to visual odometry for determining the position and orientation of a robot in a wide variety of robotic applications. Specifically, ICP is commonly used to reconstruct two-dimensional (2D) or three-dimensional (3D) surfaces or to localize robots and achieve optimal path planning. ICP iteratively revises the transformation (e.g., translation and rotation) needed to minimize an error metric, such as a distance between the coordinates of the matched pairs from the source cloud to the target cloud.

Keypoint detection is often the first step for ICP applications such as simultaneous localization and mapping (SLAM) that constructs or updates a map of an unknown environment while simultaneously keeping track of an agent's location within it or visual tracking, robustness and accuracy of which are potentially affected by the keypoint detection.

Conventional keypoint detectors suffer from high computation complexity by using all points for ICP algorithm. Further, ICP performance is poorly degraded due to non-ideal feature pair. Therefore, a need has arisen to propose a novel keypoint selection technique to overcome drawbacks of the conventional keypoint detectors.

SUMMARY OF THE INVENTION

In view of the foregoing, it is an object of the embodiment of the present invention to provide a motion-aware keypoint selection system adaptable to iterative closest point (ICP) with reduced computation complexity and enhanced accuracy for ICP.

According to one embodiment, a motion-aware keypoint selection system adaptable to iterative closest point (ICP) includes a pruning unit, a point quality estimation unit and a suppression unit. The pruning unit receives an image and selects at least one region of interest (ROI) composed of a selected subset of points on the image. The point quality estimation unit generates point quality of each point in the ROI according to a frame rate. The suppression unit receives the point quality and generates keypoints by screening the ROI.

BRIEF DESCRIPTION OF THE DRAWINGS

FIG. 2A shows an exemplary depth image of one line;

FIG. 2B shows a depth image, on which a near edge region (NER), an occluded skipping region (OSR) and a noise skipping region (NSR) have been determined by the pruning unit of FIG. 1 according to the embodiment of the present invention;

DETAILED DESCRIPTION OF THE INVENTION

Figure 1:
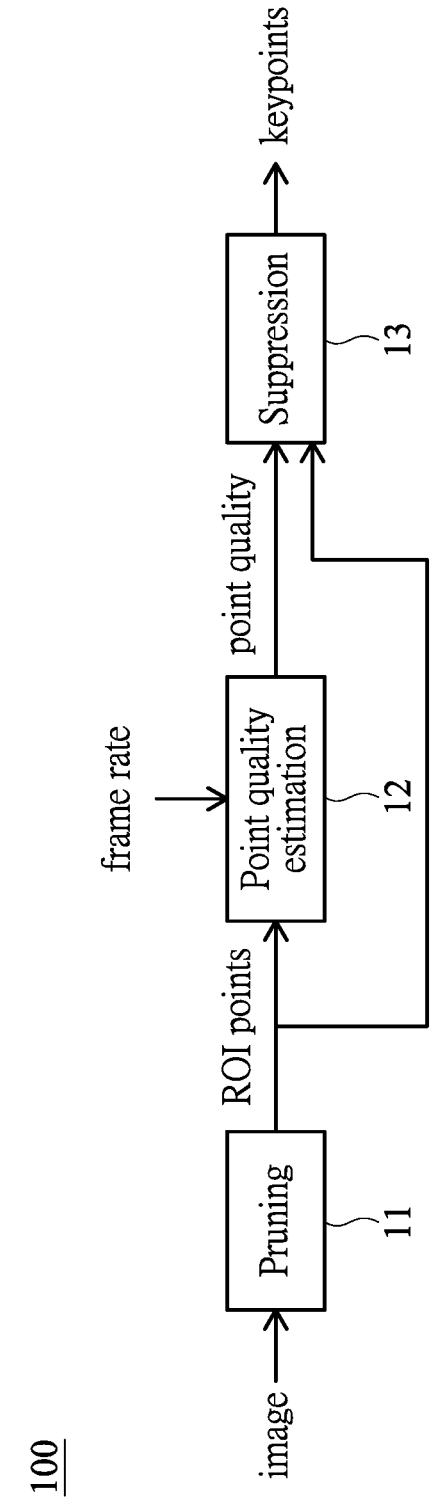
FIG. 1 shows a block diagram illustrating a motion-aware keypoint selection system adaptable to iterative closest point (ICP) according to one embodiment of the present invention.

FIG. 1 shows a block diagram illustrating a motion-aware keypoint selection system ("keypoint selection system" hereinafter) 100 adaptable to iterative closest point (ICP) according to one embodiment of the present invention. The blocks of the keypoint detection system 100 may be implemented by software, hardware or their combination, and may be performed, for example, by a digital image processor.

In one exemplary embodiment, the keypoint detection system 100 may be adapted to an augmented reality (AR) device. Hardware components for the AR device may primarily include a processor (e.g., an image processor), a display (e.g., head-mounted display) and sensors (e.g., a color-depth camera such as RGB-D camera for red, green, blue plus depth). Specifically, the sensors or camera captures scenes to generate image frames, which are then fed to the processor that performs the operations of the keypoint detection system 100. Augmented reality is then rendered in the display In the embodiment, the keypoint selection system 100 may include a pruning unit 11 coupled to receive an image, and configured to select at least one region of interest (ROI) composed of a selected subset of points (or pixels) on the image by screening the image. Points other than the points in the ROI are discarded to simplify further processing of the keypoint selection system 100 and substantially decrease computation complexity without significantly reducing accuracy. Each point of the image may, for example, include color (e.g., red, green and blue) and depth. It is noted that the operation of the pruning unit 11 of the embodiment is point-based.

According to one aspect of the embodiment, a criterion for the pruning unit 11 is that near edge regions are selected as the ROI. FIG. 2A shows an exemplary depth image of one line, where $q_n$ represents a last valid (or background) pixel (or occluded edge), and $q_c$ represents a current valid (or foreground) pixel (or occluding edge). FIG. 2B shows a depth image, on which a near edge region (NER) (i.e., ROI), an occluded skipping region (OSR) and a noise skipping region (NSR) have been determined by the pruning unit 11 of FIG. 1 according to the embodiment of the present invention. The OSR abuts on the left of the last valid pixel $q_n$, and the NSR abuts on the right of the current valid pixel $q_c$. Specifically, as the NSR, commonly composed of a plurality of (e.g., 12) pixels, corresponds to boundaries or corners and their normal are difficult to be estimated, the NSR is thus discarded in the embodiment. As the OSR, commonly composed of a plurality of (e.g., 2) pixels, corresponds to occluded regions which do not have correct correspondence (in a target frame), the OSR is thus discarded in the embodiment. The NER (commonly composed of a plurality of pixels) to the left of the OSR and the NER to the right of the NSR are selected as the ROI because it contains useful information. In one embodiment, the pixel width of the OSR, the NSR and the NER may be predetermined.

The keypoint selection system 100 of the embodiment may include a point quality estimation unit 12 configured to generate point quality of each point in the ROI according to a frame rate, thus resulting in a motion-aware keypoint selection system 100. It is noted that the operation of the point quality estimation unit 12 of the embodiment is point-based.

In one embodiment, a saliency function of the point quality estimation unit 12 adopts a noise model as disclosed in "Modeling Kinect Sensor Noise for Improved 3D Reconstruction and Tracking," entitled to C. V. Nguyen et al., published in 2012 Second International Conference on 3D Imaging, Modeling, Processing, Visualization & Transmission, the disclosure of which is incorporated herein by reference.

Figure 3:
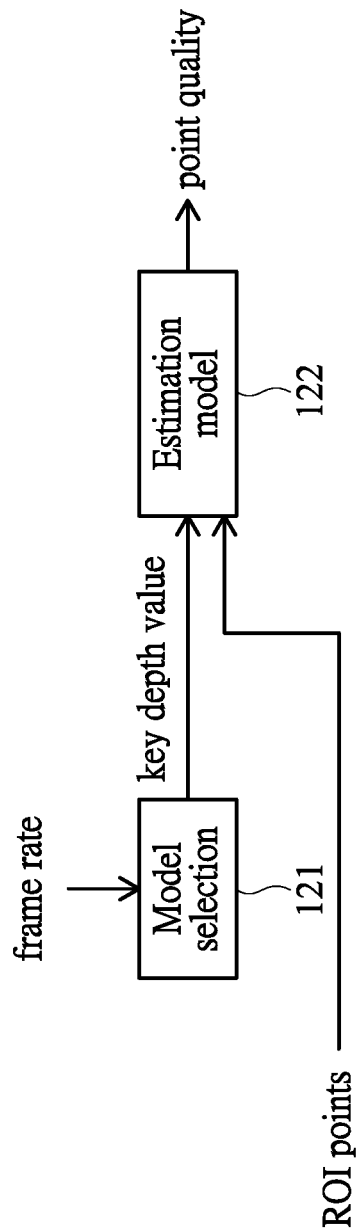
FIG. 3 shows a detailed block diagram of the point quality estimation unit of FIG. 1.

FIG. 3 shows a detailed block diagram of the point quality estimation unit 12 of FIG. 1. Specifically, the point quality estimation unit 12 may include a model selection unit 121 configured to generate a key depth value according to the frame rate. In one embodiment, the model selection unit 121 may include a lookup table derived empirically, according to which the key depth value corresponding to the frame rate may be obtained. The frame rate may be obtained from a speedometer or an Inertial Measurement Unit (IMU).

Figure 4A:
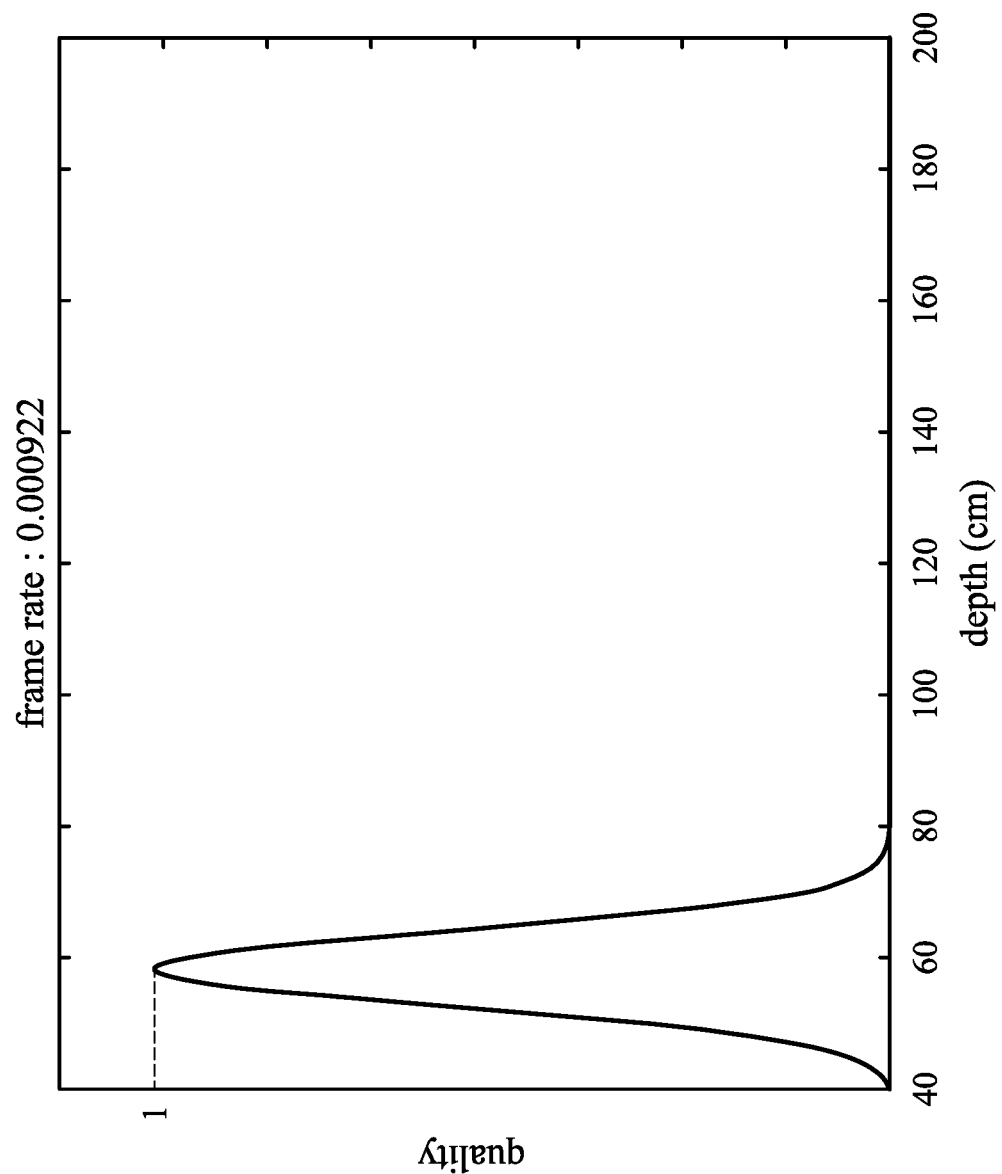
FIG. 4A to FIG. 4C show exemplary quality-depth curves with respect to different frame rates.
Figure 4B:
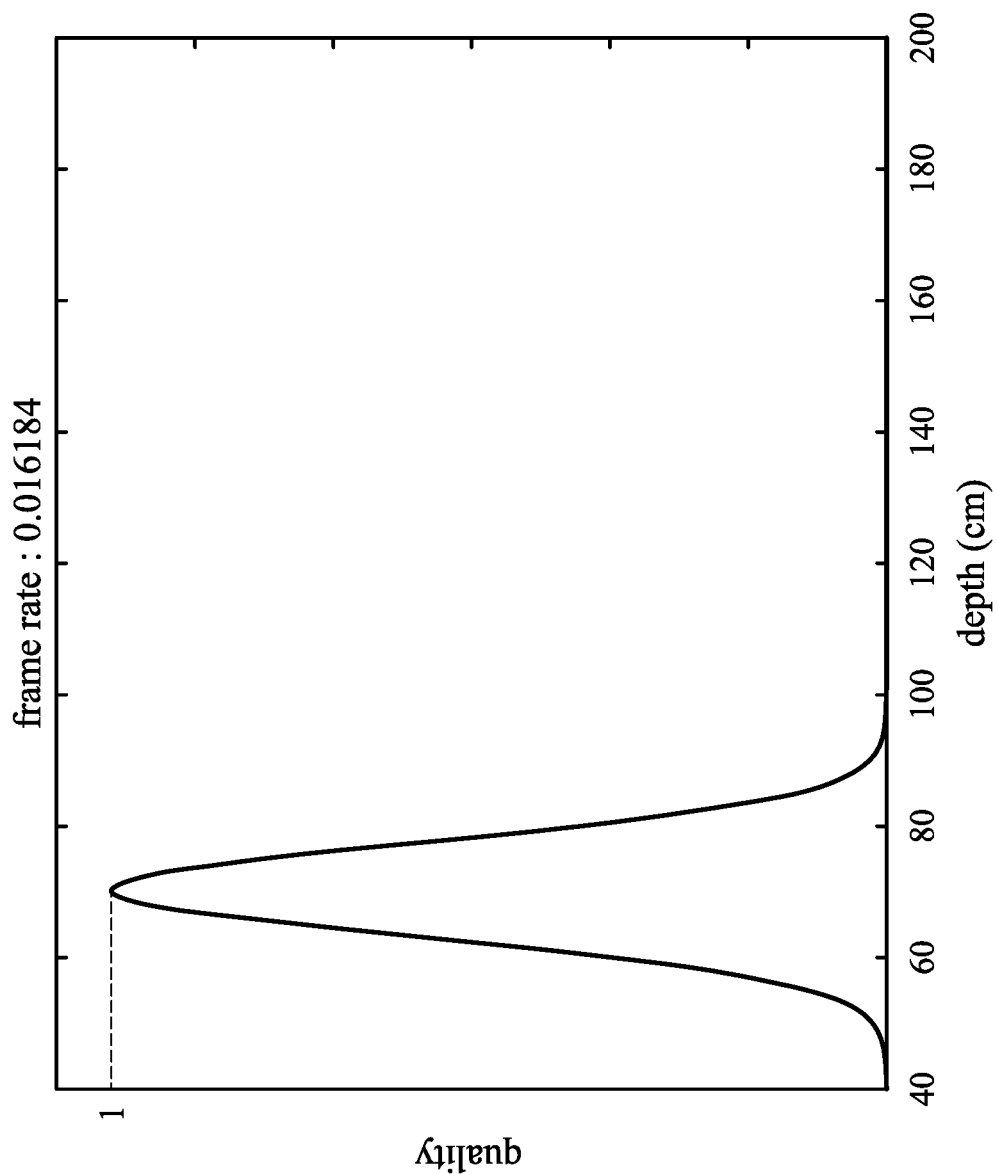
Figure 4C:
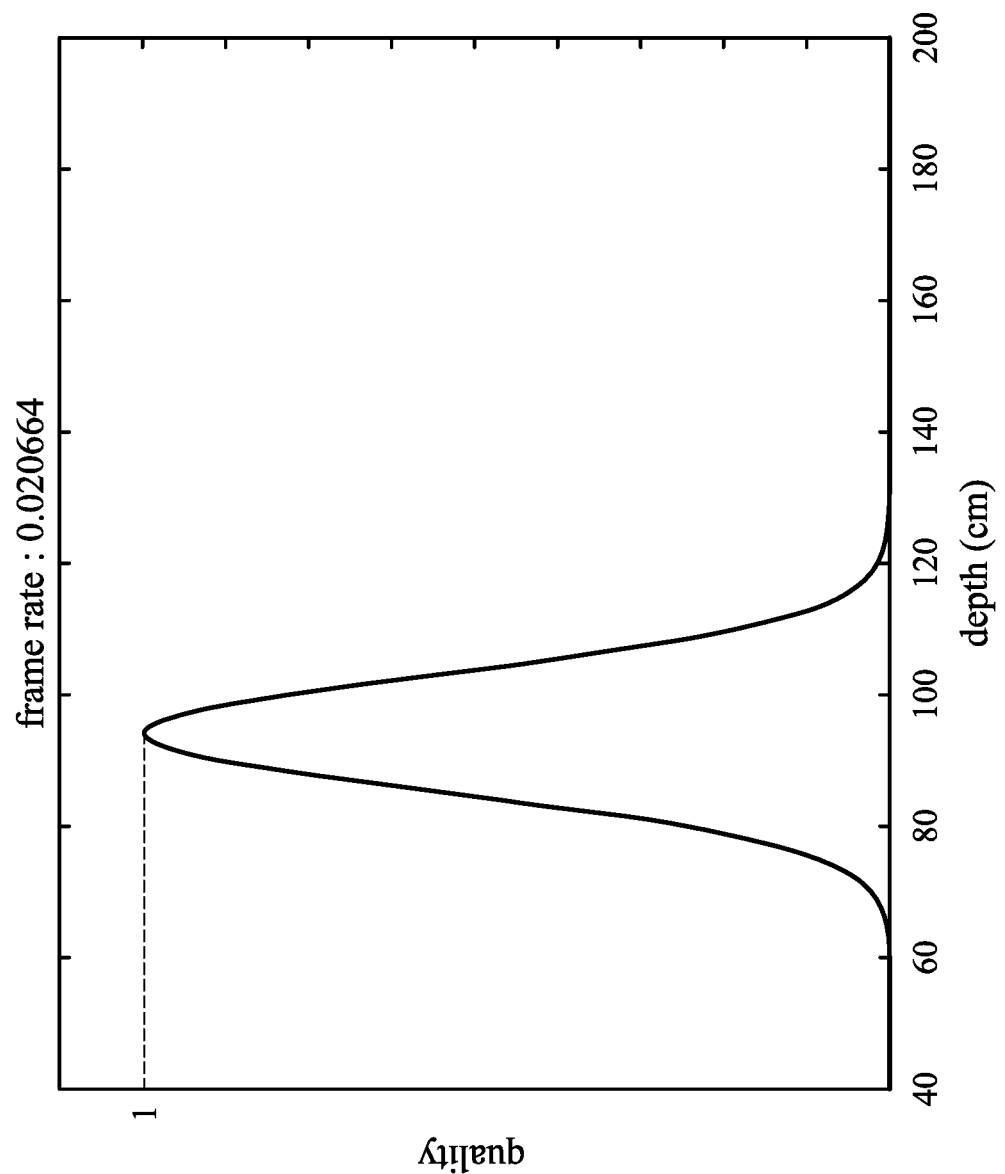

FIG. 4A to FIG. 4C show exemplary quality-depth curves with respect to different frame rates, in which the depth value corresponding to a peak is the key depth value. As exemplified in FIG. 4A to FIG. 4C, the larger the frame rate is, the larger the key depth value is.

Referring back to FIG. 3, the point quality estimation unit 12 may include an estimation model unit 122 coupled to receive the key depth value (from the model selection unit 121) to construct the quality-depth curve, according to which the point quality corresponding to a point in the ROI may be obtained. In one embodiment, the quality-depth curve may be stored as a lookup table. Specifically, as exemplified in FIG. 4A with a frame rate of 0.000922, the estimation model unit 122 receives the key depth value (e.g., about 60 cm) from the model selection unit 121. Next, the estimation model unit 122 sets the key depth value as the peak of the curve, and the peak corresponds to point quality of 1 (i.e., maximum point quality). Subsequently, the estimation model unit 122 adopts a predetermined function (e.g., Gaussian function) and sets the maximum point quality as the peak of the curve, thereby constructing quality-depth curve (e.g., Gaussian curve) that has predetermined distribution (e.g., Gaussian or normal distribution). Accordingly, each depth value may have corresponding point quality. For other frame rates (as exemplified in FIG. 4B and FIG. 4C), the principle as described above may be adapted to obtaining associated quality-depth curves or lookup tables, according to which point quality corresponding to a point in the ROI may be obtained.

Referring back to FIG. 1, the keypoint selection system 100 may include a suppression unit 13 coupled to receive the point quality (from the point quality estimation unit 12), and configured to further screen the points in the ROI (from the pruning unit 11), thereby generating keypoints that are homogenously distributed and unclustered, thus speeding up computation since a lower number of keypoints is needed to cover the whole image. It is noted that the operation of the suppression unit 13 of the embodiment is frame-based.

Specifically, in one embodiment, the suppression unit 13 adopts non-maximal suppression (NMS) algorithm, details of which may be referred to "Multi-image matching using multi-scale oriented patches," entitled to M. Brown et al., published in 2005 IEEE Computer Society Conference on Computer Vision and Pattern Recognition, and "Efficient adaptive non-maximal suppression algorithms for homogeneous spatial keypoint distribution," entitled to O. Bailo et al., published in Pattern Recognition Letters, volume 106, April 2018, pages 53-60, the disclosures of which are incorporated herein by reference.

Although specific embodiments have been illustrated and described, it will be appreciated by those skilled in the art that various modifications may be made without departing from the scope of the present invention, which is intended to be limited solely by the appended claims.

What is claimed is:

1. A motion-aware keypoint selection system adaptable to iterative closest point (ICP), comprising:
   a pruning unit that receives an image and selects at least one region of interest (ROI) composed of a selected subset of points on the image;
   a point quality estimation unit that generates point quality of each point in the ROI according to a frame rate; and
   a suppression unit that receives the point quality and generates keypoints by screening the ROI;
   wherein the pruning unit selects a near edge region (NER) as the ROI; and
   wherein the at least one ROI comprises two of said NER, one of which is to the left of an occluded skipping region (OSR), and the other of which is to the right of a noise skipping region (NSR), wherein the OSR abuts on the left of a last valid pixel, and the NSR abuts on the right of a current valid pixel.

2. The system of claim 1, wherein each point of the image comprises color and depth.

3. The system of claim 1, wherein operation of the pruning unit and the point quality estimation unit is point-based.

4. The system of claim 1, wherein operation of the suppression unit is frame-based.

5. A motion-aware keypoint selection system adaptable to iterative closest point (ICP), comprising:
   a pruning unit that receives an image and selects at least one region of interest (ROI) composed of a selected subset of points on the image;
   a point quality estimation unit that generates point quality of each point in the ROI according to a frame rate; and
   a suppression unit that receives the point quality and generates keypoints by screening the ROI, wherein the point quality estimation unit comprises:
   a model selection unit that generates a key depth value according to the frame rate.

6. The system of claim 5, wherein the model selection unit comprises a lookup table derived, according to which the key depth value corresponding to the frame rate is generated.

7. The system of claim 5, wherein the larger the frame rate is, the larger the key depth value is.

8. The system of claim 5, wherein the point quality estimation unit comprises:

an estimation model unit that receives the key depth value to construct a quality-depth curve, according to which the point quality corresponding to a point in the ROI is generated.

9. The system of claim 8, wherein the quality-depth curve is stored as a lookup table.

10. The system of claim 8, wherein the estimation model unit performs the following steps:
   receiving the key depth value;
   setting the key depth value as a peak of the quality-depth curve, and corresponding the peak to maximum point quality; and
   adopting a predetermined function and setting the maximum point quality as the peak of the quality-depth curve, thereby constructing the quality-depth curve and corresponding each depth value to associated point quality.

11. The system of claim 10, wherein the predetermined function comprises Gaussian function.

* * * * *